United States Patent
Kulkarni et al.

(10) Patent No.: US 10,303,788 B2
(45) Date of Patent: May 28, 2019

(54) EFFICIENT DETERMINATION OF COMMITTED CHANGES

(71) Applicant: Oracle International Corporation, Redwood Shores, CA (US)

(72) Inventors: Kartik Kulkarni, Foster City, CA (US); Juan R. Loaiza, Woodside, CA (US); Vivekanandhan Raja, Foster City, CA (US); Kothanda Umamageswaran, Sunnyvale, CA (US); Sanket Hase, Mountain View, CA (US); Vasudha Krishnaswamy, Fremont, CA (US); Tirthankar Lahiri, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 211 days.

(21) Appl. No.: 15/253,630

(22) Filed: Aug. 31, 2016

(65) Prior Publication Data

US 2018/0060378 A1 Mar. 1, 2018

(51) Int. Cl.
*G06F 17/30* (2006.01)

(52) U.S. Cl.
CPC .... *G06F 17/30371* (2013.01); *G06F 17/3056* (2013.01); *G06F 17/30368* (2013.01); *G06F 17/30377* (2013.01)

(58) Field of Classification Search
None
See application file for complete search history.

(56) References Cited

U.S. PATENT DOCUMENTS

| 6,754,657 | B2* | 6/2004 | Lomet | G06F 17/30551 |
| 7,233,947 | B2* | 6/2007 | Lomet | G06F 17/30551 707/703 |
| 7,653,664 | B2* | 1/2010 | Chitre | G06F 17/30575 707/610 |
| 7,899,799 | B2* | 3/2011 | Furuya | G06F 17/30362 707/703 |

(Continued)

OTHER PUBLICATIONS

Kulkarni, U.S. Appl. No. 15/253,626, filed Aug. 31, 2016, Notice of Allowance, dated Jul. 3, 2018.

(Continued)

*Primary Examiner* — Debbie M Le
(74) *Attorney, Agent, or Firm* — Hickman Palermo Becker Bingham LLP

(57) ABSTRACT

A minimum value (MV) is computed for start timestamps that each correspond to an uncommitted transaction. In an embodiment, the MV is computed for a pluggable database that is open on at least first and second instances of a database. The MV is computed for the first instance as of a first current timestamp (CT). The MV and the first CT are communicated to a second instance that has a second CT. If the first and second CTs are equal, the second instance store the MV. If the first CT is bigger, the second CT also becomes equal to the first CT. If the first CT is smaller, the MV is discarded, and the first CT becomes equal to the second CT. In an embodiment, if the MV remains unchanged for a predetermined time period, a start timestamp corresponding to the MV is advanced to a current or future timestamp.

20 Claims, 9 Drawing Sheets

(56) References Cited

U.S. PATENT DOCUMENTS

| | | | |
|---|---|---|---|
| 7,953,749 B2* | 5/2011 | Sinha | G06F 17/30368 |
| | | | 707/769 |
| 8,838,919 B2 | 9/2014 | Shi et al. | |
| 8,868,492 B2 | 10/2014 | Garin et al. | |
| 9,063,969 B2* | 6/2015 | Lee | G06F 17/30377 |
| 9,430,274 B2* | 8/2016 | Zhang | G06F 17/30008 |
| 9,971,674 B2* | 5/2018 | Hwang | G06F 11/3688 |
| 2015/0120659 A1 | 4/2015 | Srivastava et al. | |
| 2017/0185636 A1* | 6/2017 | Horii | G06F 17/30312 |

OTHER PUBLICATIONS

Kulkarni, U.S. Appl. No. 15/253,626, Filed Aug. 13, 2016, Notice of Allowance dated Nov. 23, 2019.

* cited by examiner

EFFICIENT DETERMINATION OF COMMITTED CHANGES

FIELD OF THE DISCLOSURE

Embodiments relate to database management systems and more specifically, to efficient determination of committed changes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Efficient database management systems (DBMSs) typically allow data blocks to be concurrently accessed by readers and writers. Readers have access to changes to data blocks made by committed transactions. However, readers are unable to access changes made by uncommitted transactions to data blocks; instead, readers access older versions of the data blocks. Thus, a DBMS may maintain read consistency based at least in part on determining, for a particular data block, which changes are committed and which changes remain uncommitted. However, data blocks fail to store inline data indicating whether changes to the data blocks are committed or uncommitted. As a result, determining whether changes are committed or uncommitted may be a time-consuming process that involves finding out which transaction made the changes and looking up the transaction's status in a separate table. In some contexts, this process may slow down readers substantially. For example, in a clustered database environment, multiple transactions may concurrently modify a data block. Thus, the slow down may be multiplied by the number of concurrent transactions, thereby causing a reader to become bottlenecked.

One approach for reducing the slow down is to store, in data blocks, inline data indicating whether changes to the data blocks are committed. However, this approach may involve significant overhead for some transactions. For example, significant memory overhead may be involved in remembering all of the data blocks that were modified by a large transaction. Additionally, significant computing overhead may be involved in (1) bringing all of the data blocks into main memory cache and (2) updating each of the data blocks to store data indicating that the large transaction has committed. Furthermore, synchronization overhead may be involved when multiple transactions compete for access to the data blocks.

Another approach for reducing the slow down is to maintain centralized data indicating committed transactions for all data blocks. The centralized data may be updated synchronously by transactions when the transactions commit. However, this approach may shift the slow down to transaction commit processing. For example, in a clustered database environment, the centralized data may have to be distributed and replicated across multiple database instances, thereby prolonging transaction commit times. Additional overhead may be incurred in maintaining the consistency of the centralized data across the multiple database instances.

Thus, there is a need for an approach that enables quickly determining whether changes are committed while minimizing the overhead involved in making the determination.

DETAILED DESCRIPTION

Figure 1:
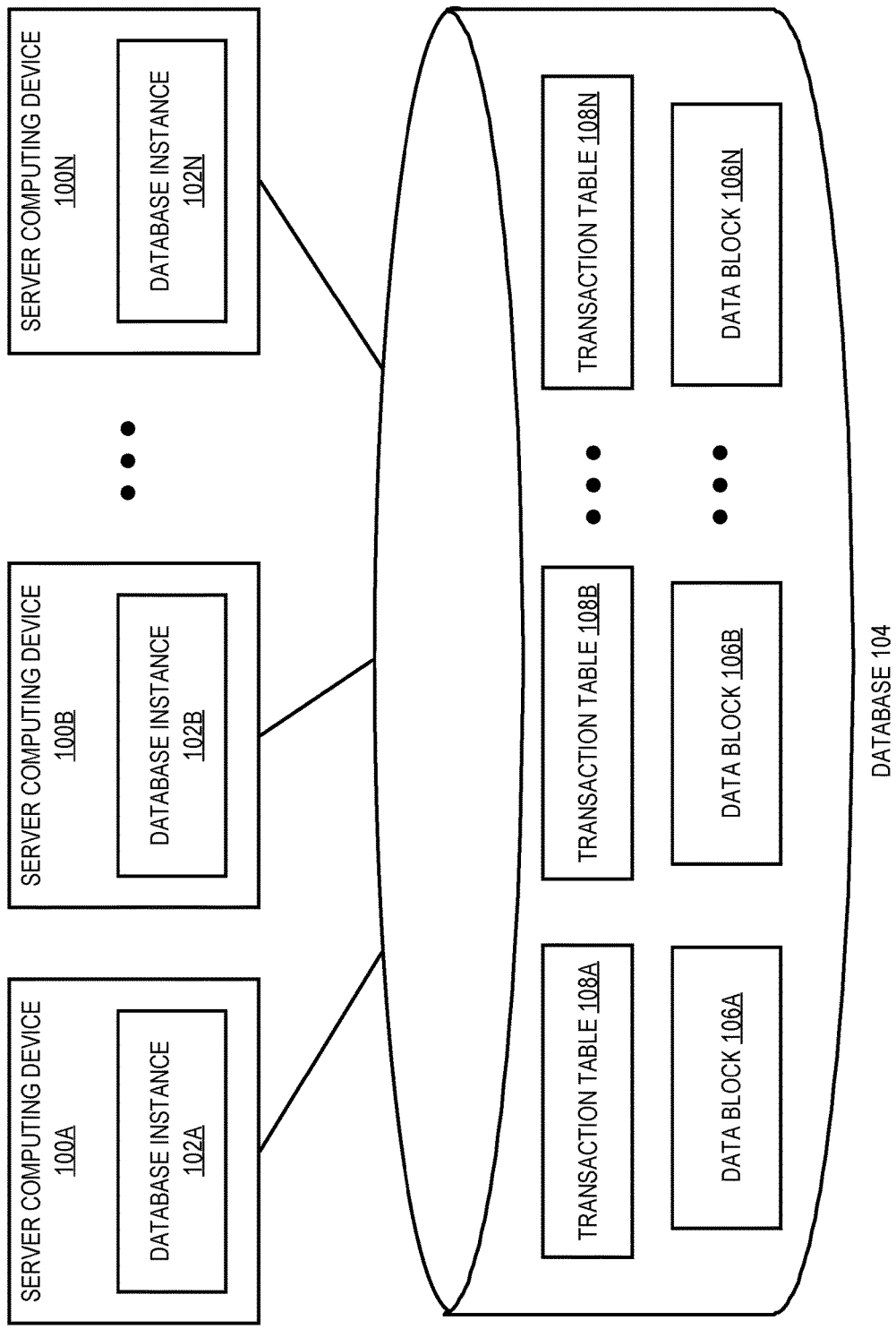
FIG. 1 depicts an example computer architecture on which embodiments may be implemented.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order. For example, a second instance may be so named although, in reality, it may correspond to a first, second, and/or third instance.

General Overview

For a particular database, a reader determines whether a particular data block has any uncommitted changes based on comparing a reference timestamp to a "last modified" timestamp of the particular data block. If the reference timestamp is greater than the "last modified" timestamp, the reader infers that all changes to the particular data block are committed. This inference is based on the reference timestamp's equivalency to a start timestamp of an oldest uncommitted transaction of the particular database. In other words, any transaction associated with a timestamp that is older than the reference timestamp must be a committed transaction of the particular database.

A background process computes the reference timestamp based on determining a minimum value of start timestamps corresponding to uncommitted transactions of the particular database. In a clustered database environment, however, different sets of transactions may be executed in different database instances. Thus, establishing a common minimum value for all of the different database instances may involve inter-instance synchronization, which enables different database instances to share their knowledge of transactions. For example, a particular database instance's knowledge of transactions may be reflected in the particular database instance's current timestamp. Thus, synchronization may involve communicating current timestamps between database instances.

A multi-tenant database environment comprising multiple tenant databases further complicates reference timestamp computation. In this context, a separate minimum value is established for each tenant database, because a particular tenant database may be open on less than all database instances at any given time. Since the particular tenant database may be continuously opening and/or closing on database instances, synchronization involves communicating a minimum value together with a current timestamp as of which the minimum value was computed.

For example, a particular tenant database may be open on multiple database instances including a first instance and a second instance. A first current timestamp reflects the first instance's knowledge of transactions, and a second current timestamp reflects the second instance's knowledge of transactions. As of the first current timestamp, a reference timestamp is computed for the first instance. The first current timestamp and the reference timestamp are both transmitted from the first instance to the second instance. At the second instance, the first current timestamp is compared to the second current timestamp. If the first current timestamp is equal to the second current timestamp, the second instance stores the reference timestamp. If the first current timestamp is greater than the second current timestamp, the second current timestamp is advanced to become equal to the first current timestamp, and the reference timestamp is stored in the second instance. If the first current timestamp is less than the second current timestamp, the second instance discards the reference timestamp and causes the first current timestamp to become equal to the second current timestamp.

In a clustered database environment and/or a multi-tenant database environment, reference timestamps typically advance as transactions commit. Thus, reference timestamps typically change with some frequency. At times, however, a reference timestamp may remain unchanged for a lengthy period of time. For example, a long-running transaction that remains uncommitted for several days prevents a reference timestamp from advancing for several days, because the long-running transaction is the oldest uncommitted transaction. Thus, the reference timestamp may become a stale reference that fails to account for a large number of transactions that have since committed. To mitigate staleness, the long-running transaction's start timestamp may be manipulated so that the reference timestamp corresponds to a different transaction's start timestamp. This can be achieved by advancing the long-running transaction's start timestamp to a current or future timestamp of a database instance, thereby allowing the different transaction's start timestamp to become a minimum value.

General Architecture

The techniques described herein are not limited to any particular computer architecture. Any computer architecture described herein is provided by way of example for explanatory purposes. FIG. 1 depicts an example computer architecture on which embodiments may be implemented. Referring to FIG. 1, server computing devices 100A-N correspond to database instances 102A-N, which share database 104. The label "N" used with any reference numeral herein connotes that any number of items or sets of items may be present or used in embodiments, as in "1 to n items". Database 104 includes data blocks 106A-N and transaction tables 108A-N.

A clustered database environment may include server computing devices 100A-N and database 104. Server computing devices 100A-N correspond to clustered nodes that each run one of database instances 102A-N. Each database instance of database instances 102A-N is a collection of memory and processes that interact with database 104. Database instances 102A-N collectively implement server-side functions of a DBMS. Server computing devices 100A-N may communicate with each other via an interconnect (not shown).

Each server computing device of server computing devices 100A-N is communicatively coupled to database 104. In other words, database instances 102A-N share database 104. Database 104 may be one or more systems, files, and/or data structures that store data. For example, database 104 may include a virtual disk and/or a set of physical disks. Database 104 may reside in volatile and/or non-volatile storage. Example storages include main memory, random access memory (RAM), and/or one or more hard disks.

Database 104 stores data in data blocks 106A-N. Each data block of data blocks 106A-N is a logical structure that corresponds to a particular number of bytes of physical storage space. For example, each data block of data blocks 106A-N may correspond to two kilobytes of disk space.

In some example embodiments, database 104 may store metadata separately from data that is described by the metadata. For example, a database table may be stored in data blocks 106A-N, which may be collectively stored in a larger logical structure known as a data segment. Information about transactions that effected changes to the database table may be stored in a separate data segment. In the example of FIG. 1, such metadata is stored as transaction tables 108A-N.

A transaction implements one or more changes to database 104 based on one or more instructions that are processed as a single logical operation. For example, the Structured Query Language (SQL) commands "INSERT", "UPDATE", and "DELETE" may be processed as a single transaction. Any changes implemented by a particular transaction are persisted when the particular transaction commits. A transaction that fails to commit may undergo a "rollback" operation that restores a previous version of data.

When database 104 is changed, a system change number (SCN) may monotonically increase. The SCN represents a logical time that corresponds to a particular state of database 104. In a clustered database environment, different database instances can have different states depending on which changes were made at which database instances. For example, database instances 102A-C may each begin at SCN 0. If transaction A is only executed at database instances 102A-B, then database instances 102A-B would each have an SCN that advances to 1 when transaction A starts making a change, advances to 2 when transaction A makes another change, and advances to 3 when transaction A commits. However, database instance 102C would remain at SCN 0, because transaction A is unknown to database instance 102C.

In some example embodiments, each transaction table of transaction tables 108A-N may record a set of SCNs for a set of transactions. At a minimum, the set of SCNs include a start SCN for each transaction. Each start SCN indicates when a corresponding transaction began making changes. Additionally, the set of SCNs may include commit SCNs for each committed transaction. Each commit SCN indicates when a corresponding transaction became a committed transaction.

Figure 2:
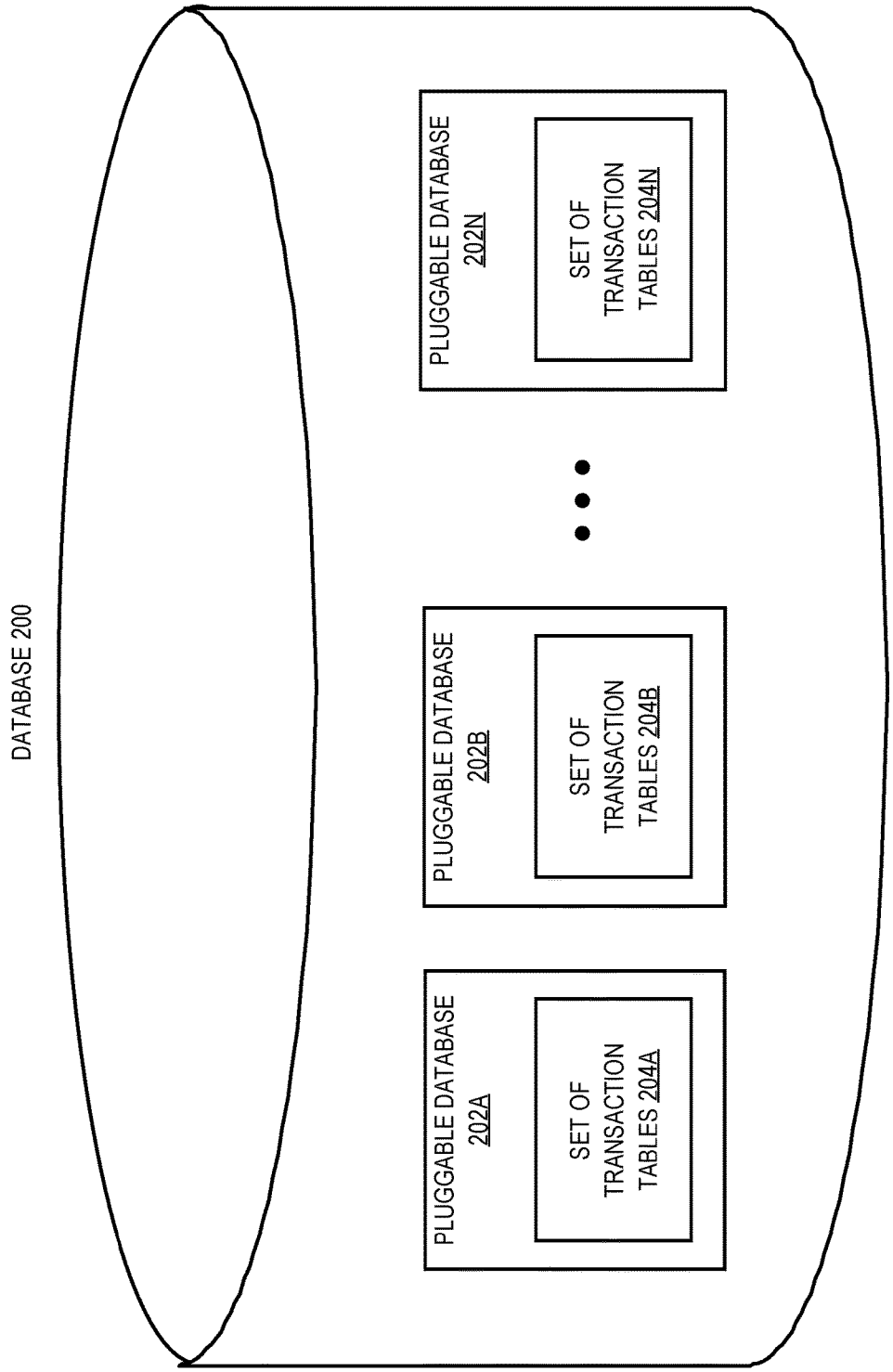
FIG. 2 depicts a detailed view of a database, in an example embodiment.

FIG. 2 depicts a detailed view of a database, in an example embodiment. Referring to FIG. 2, database 200 includes pluggable databases 202A-N, which correspond to sets of transaction tables 204A-N.

In some example embodiments, database 200 may be database 104. Database 200 is a multi-tenant database and may function as a container database for zero or more tenant databases, such as pluggable databases 202A-N. Database 200 may be managed in accordance with any of the techniques described in U.S. patent application Ser. No. 15/093,506, filed Apr. 7, 2016; and U.S. Pat. No. 9,239,763, filed Sep. 28, 2012, the entire contents of each of which are incorporated herein by reference.

A container database that includes multiple separate pluggable databases 202A-N provides in-database virtualization for consolidating the multiple separate pluggable databases 202A-N. In other words, a container database allows more than one pluggable database to run on a single database instance, thereby allowing the single database instance's computing resources to be shared between/among multiple pluggable databases. However, a container database provides database isolation between pluggable databases such that users of a database session established for a particular pluggable database may only access database objects defined in a database dictionary of the particular pluggable database.

Each pluggable database of pluggable databases 202A-N may be "plugged in" to a container database and may be transported between database instances and/or DBMSs. In other words, pluggable databases may continuously open and/or close on a particular database instance. Thus, in some example embodiments, each pluggable database may have a local transaction table to facilitate portability. In the example of FIG. 2, each pluggable database includes a respective set of transaction tables. Each set of transaction tables of sets of transaction tables 204A-N may include one or more transaction tables of transaction tables 108A-N.

Computation of Reference Timestamps

Figure 3:
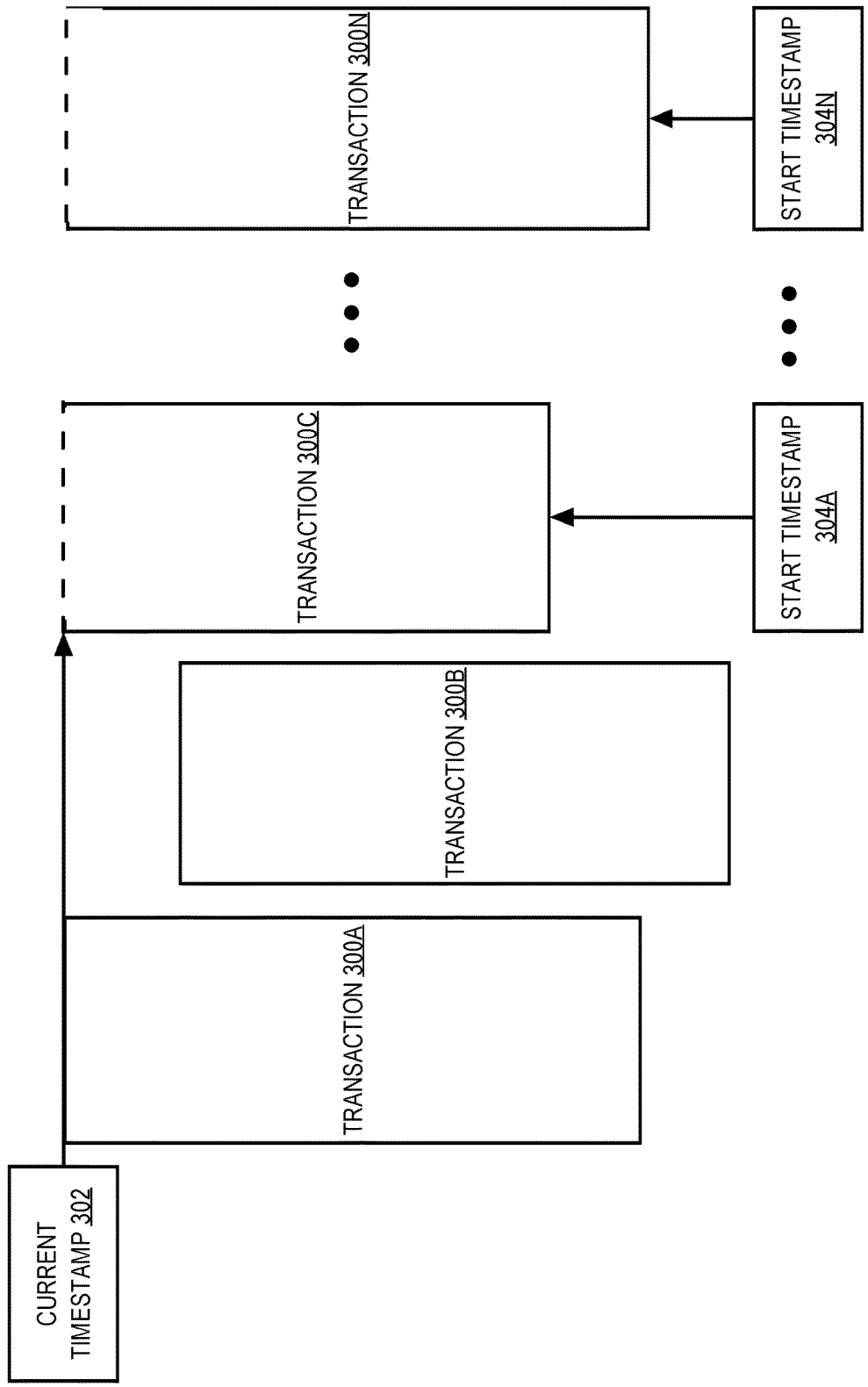
FIG. 3 depicts an example approach for computing a minimum value of start timestamps.

In a clustered database environment and/or a multi-tenant database environment, efficient determination of committed changes is based on computing a minimum value of start timestamps. FIG. 3 depicts an example approach for computing a minimum value of start timestamps. Referring to FIG. 3, transactions 300A-N are depicted as of current timestamp 302. Start timestamps 304A-N correspond to transactions 300C-N.

In the example of FIG. 3, transactions 300A-B are committed transactions, and transactions 300C-N are uncommitted transactions as of current timestamp 302. Current timestamp 302 may be a local most-recent SCN for a particular database instance, such as a master database instance (described in greater detail below). Additionally or alternatively, current timestamp 302 may be a global most-recent SCN for all database instances 102A-N of a particular database 104. Additionally or alternatively, current timestamp 302 may be a common most-recent SCN for any database instances on which a particular tenant database is open. The global most-recent SCN and/or the common most-recent SCN may be determined based on synchronizing local most-recent SCNs across database instances using a synchronization algorithm, such as a Lamport clock synchronization algorithm.

Determining the global most-recent SCN and/or the common most-recent SCN may involve determining a master database instance for database instances 102A-N. In some example embodiments, mastership may be determined based on any number of database instances 102A-N contesting for a global lock.

For example, in a clustered database environment, a particular database instance that obtains a global lock becomes a master database instance and synchronously communicates its local most-recent SCN to other database instances. If the master database instance's local most-recent SCN is greater than that of a recipient database instance, the recipient database instance adopts the master database instance's local most-recent SCN and replies to the master database instance with an acknowledgement message. However, if the recipient database instance's local most-recent SCN is higher than that of the master database instance, the recipient database instance sends its local most-recent SCN to the master database instance for adoption. Such synchronous communications continue until all database instances 102A-N share a global most-recent SCN.

In a clustered database environment and/or a multi-tenant database environment, a minimum value of start timestamps 304A-N may be computed as of current timestamp 302. Each start timestamp depicted in FIG. 3 is a start SCN corresponding to an uncommitted transaction of a master database instance. The master database instance may scan its transaction tables and determine the minimum value based on comparing start timestamps 304A-N. In the example of FIG. 3, the minimum value corresponds to start timestamp 304N. The minimum value guarantees that any transaction, such as transaction 300B, with a start timestamp that is less than the minimum value is a committed transaction. The master database instance publishes the minimum value to other database instances and relinquishes mastership. The other database instances may store the minimum value where it is accessible to readers.

In some example embodiments, synchronizing current timestamps and/or minimum values may be performed differently for different types of database environments. For a clustered database environment without multi-tenancy, computing a minimum value may involve at least two phases—(1) determining a global most-recent SCN and (2) computing a global minimum value as of the global most-recent SCN. In other words, the global minimum value is computed only after the global most-recent SCN is definitively determined. However, for a clustered database environment with multi-tenancy, computing a common minimum value may be performed concurrently with determining a common most-recent SCN. Thus, a minimum value may be computed based on assuming that a local most-recent SCN is a common most-recent SCN for all database instances on which a particular tenant database is open. If this assumption is incorrect, the minimum value may be recomputed based on a different most-recent SCN. Thus, multiple rounds of inter-instance communications may be involved. Eventually, there will be consistency across multiple database instances when inter-instance communications concurrently yield a common most-recent SCN and a common minimum value. Determining a common most-recent SCN and a common minimum value in a single phase may be necessary due to tenant databases continuously opening and/or closing on database instances.

Inter-Instance Synchronization with Multi-Tenancy

Figure 4:
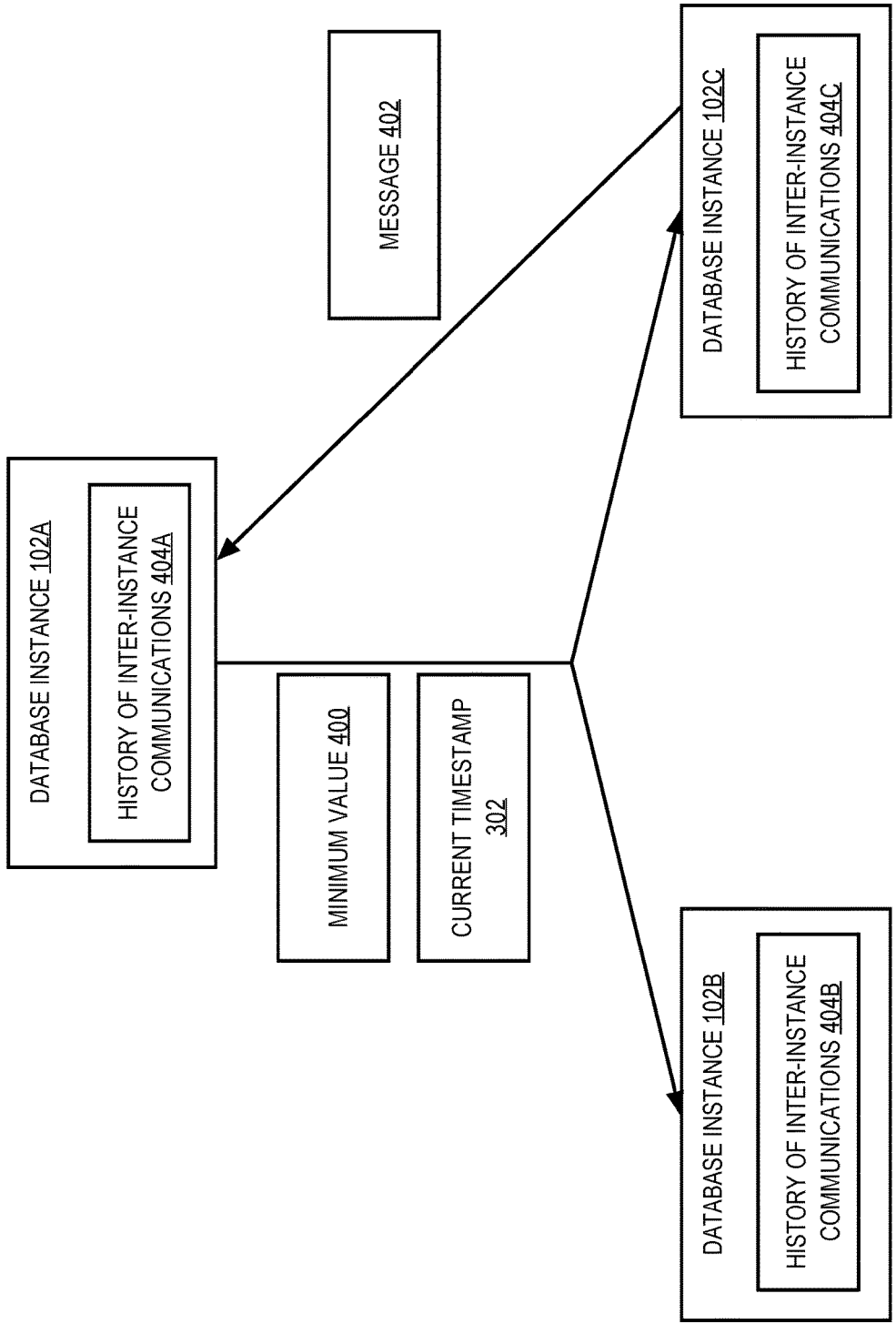
FIG. 4 is a block diagram that depicts an example round of inter-instance communications in a multi-tenant database environment.

As mentioned above, in a clustered database environment with multi-tenancy, computing a minimum value may be performed concurrently with synchronizing current timestamps. Thus, inter-instance synchronization involves communicating the minimum value and current timestamp 302 together in each round of inter-instance communications. FIG. 4 is a block diagram that depicts an example round of inter-instance communications in a multi-tenant database environment. Referring to FIG. 4, database instance 102A communicates minimum value 400 and current timestamp 302 to database instances 102B-C. Database instance 102C replies to database instance 102A with message 402. Database instances 102A-C maintain histories of inter-instance communications 404A-C.

Each round of inter-instance communications may involve sending a minimum value together with a local most-recent SCN from a master database instance to other database instances. Mastership differs in a clustered database environment with multi-tenancy as compared to a clustered database environment without multi-tenancy. In a clustered database environment without multi-tenancy, a single database instance may be a master database instance until all database instances share a global minimum value for an entire database. However, in a clustered database environment with multi-tenancy, a common minimum value is established for a particular tenant database instead of an entire database. As mentioned above, tenant databases may continuously open and close on database instances. Thus, at any given moment, a different set of database instances may be involved in inter-instance communications. For example, a particular database instance may be included in one round of inter-instance communications and excluded from another round or vice versa. To account for this difference, there is a concept of "roving" mastership for clustered multi-tenant database environments. According to this concept, different database instances may take turns serving as a master database instance so that each round of inter-instance communications may have a different master database instance. Significantly, this avoids a situation in which a tenant database closes on a master database instance, thereby leaving database instances "masterless" and unable to synchronize. However, "roving" mastership may entail achieving eventual consistency across database instances in terms of current timestamps and minimum values.

In the example of FIG. 4, database instances 102A-C are a subset of database instances 102A-N on which a particular pluggable database is currently open. Mastership may be determined based on database instances 102A-C contesting for a global lock. In FIG. 4, database instance 102A obtains the global lock and becomes a master database instance. The master database instance scans its transaction tables and computes minimum value 400 as of current timestamp 302. To reduce network traffic, the master database instance may publish minimum value 400 and current timestamp 302 only to database instances 102A-C on which the particular pluggable database is currently open. Publication may involve an asynchronous broadcast, because the particular pluggable database is continuously opening and closing on database instances. The master database instance then relinquishes mastership, and a different database instance may obtain mastership thereafter.

If a particular database instance that receives minimum value 400 and current timestamp 302 has a local most-recent SCN that is equal to current timestamp 302, the particular database instance will store minimum value 400 where it is accessible to readers. If the particular database instance's local most-recent SCN is less than current timestamp 302, in addition to storing minimum value 400, the particular database instance will adopt current timestamp 302 as its local most-recent SCN. However, if the particular database instance's local most-recent SCN is greater than current timestamp 302, the particular database instance will discard minimum value 400 and reply to the master database instance with message 402, which includes the particular database instance's local most-recent SCN.

If inter-instance communications are asynchronous, minimum value 400 and/or current timestamp 302 may be stale when they are processed by the particular database instance. Referring to FIG. 4, a particular pluggable database may be open on database instances 102A-C when database instance 102A sends minimum value 400 and current timestamp 302 to database instance 102B. However, the particular pluggable database may close on database instance 102B before database instance 102B receives minimum value 400 and current timestamp 302. The particular pluggable database may reopen on database instance 102B when database instance 102C obtains mastership and broadcasts a different minimum value that is greater than minimum value 400. If database instance 102B processes minimum value 400 after processing the different minimum value, minimum value 400 is a stale minimum value to database instance 102B.

To mitigate staleness, each database instance of database instances 102A-N may maintain a respective history of inter-instance communications. For example, each history of inter-instance communications of histories of inter-instance communications 404A-C may store a predetermined number of messages related to minimum values and current timestamps. Prior to storing minimum value 400 and/or adopting current timestamp 302, a database instance may compare minimum value 400 and current timestamp 302 against the minimum values and current timestamps that are maintained in its history of inter-instance communications. If minimum value 400 and/or current timestamp 302 are determined to be stale, the database instance may ignore them.

In some example embodiments, a database instance may check its history of inter-instance communications to detect other inconsistencies, such as non-stale minimum values and/or non-stale current timestamps that become smaller. For example, database instance 102C may obtain mastership and broadcast a different minimum value that is less than minimum value 400 although database instance 102C's most-recent SCN is greater than current timestamp 302. In response, database instance 102B may replace minimum value 400 with the different minimum value, which is a more conservative but less useful minimum value. Alternatively, database instance 102B may broadcast a command to reset minimum values across all database instances.

Artificial Advancement of Reference Timestamps

Figure 5:
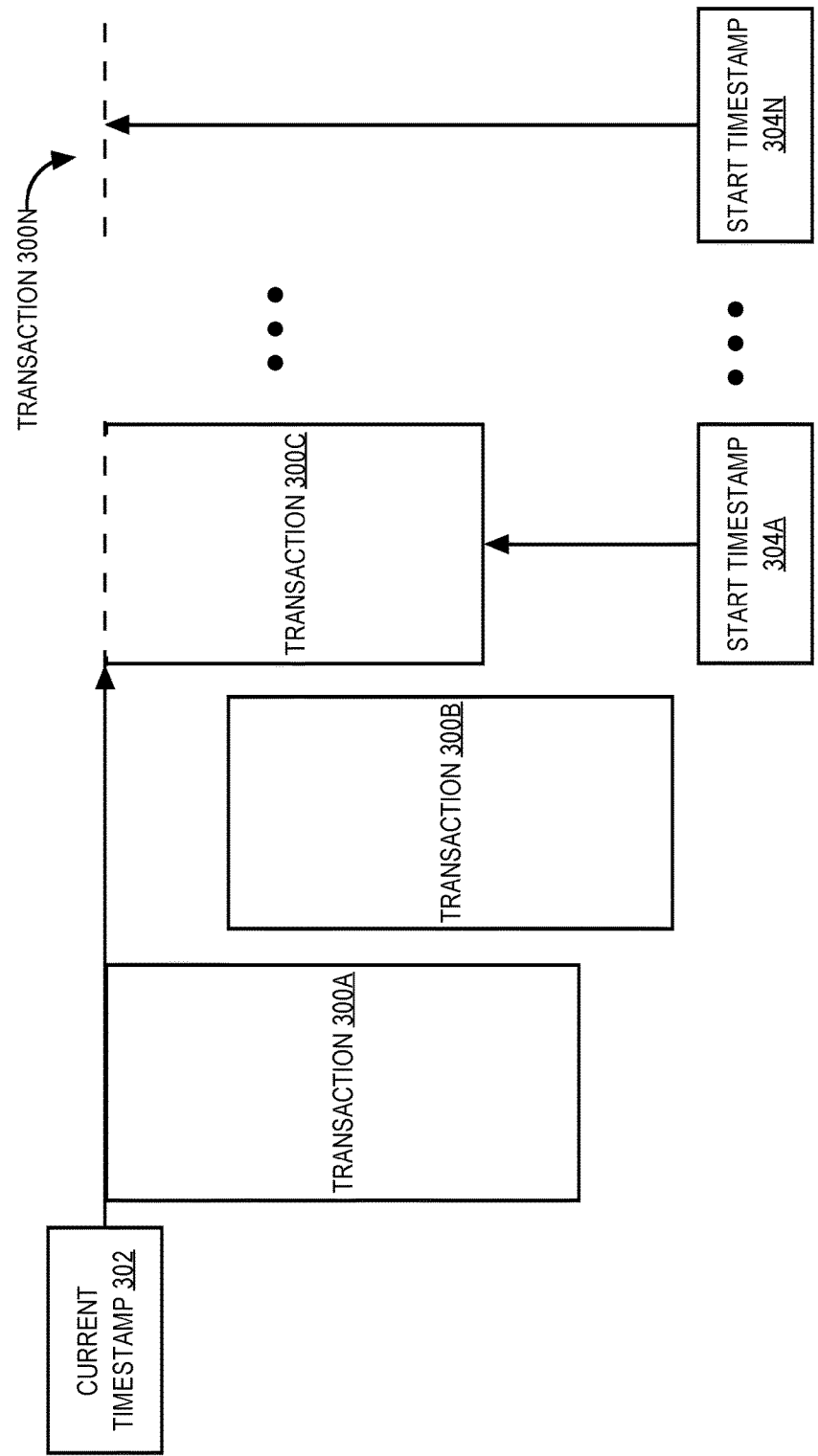
FIG. 5 depicts an example approach for advancing a start timestamp.

In a clustered database environment and/or a multi-tenant database environment, minimum values typically advance with some frequency. At times, however, a particular minimum value may remain unchanged for a long period of time. This may occur, for example, when an oldest uncommitted transaction is a long-running transaction. In such cases, the long-running transaction's start timestamp may be moved forward in time to allow the particular minimum value to change. FIG. 5 depicts an example approach for advancing a start timestamp. Referring to FIG. 5, transactions 300A-N are depicted as of current timestamp 302. Start timestamps 304A-N correspond to transactions 300C-N. Start timestamp 304N of transaction 300N is advanced to current timestamp 302.

In the example of FIG. 5, transaction 300N is a long-running transaction that prevented advancement of minimum value 400 for a predetermined time period, such as three rounds of minimum value computations. In other words, minimum value 400 was equal to start timestamp 304N for the predetermined time period. To enable minimum value 400 to resume advancing, start timestamp 304N is advanced to a point in time that is equal to current timestamp 302. Thus, start timestamp 304A may become a new minimum value. FIG. 5 is otherwise identical to FIG. 3.

Merely advancing a long-running transaction's start timestamp may result in incorrectly treating uncommitted changes as if they were committed changes. In the example of FIG. 5, start timestamp 304A becomes minimum value 400 based on artificially advancing start timestamp 304N, which was older than start timestamp 304A. However, a particular data block may have been last changed by transaction 300N at a point in time prior to start timestamp 304A. A reader that compares start timestamp 304A to a last-changed timestamp of the particular data block will incorrectly determine that all changes to the particular data block are committed. Thus, consistency should be maintained between a long-running transaction's start timestamp and last-changed timestamps of all data blocks that the long-running transaction modified. In some example embodiments, the last-changed timestamps are edited prior to advancing the long-running transaction's start timestamp. For example, the last-changed timestamps may be edited to be equal to a current SCN or a future SCN to which start timestamp 304N will be advanced. After editing the last-changed timestamps, start timestamp 304N may be edited in a transaction table for the long-running transaction.

Figure 6:
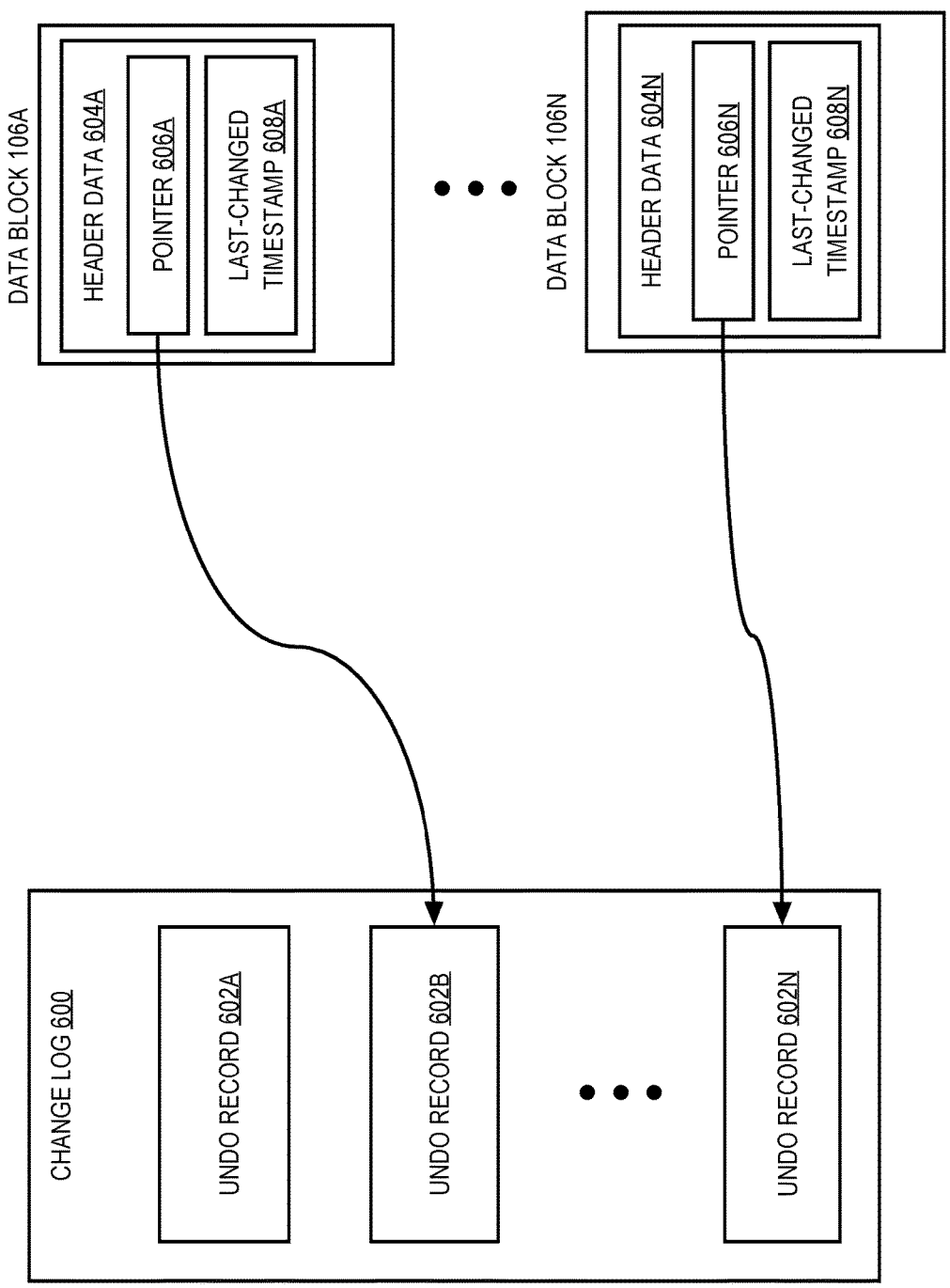
FIG. 6 depicts example relationships between data blocks and a change log.

In some example embodiments, determining which data blocks were modified by a long-running transaction may be efficiently performed based on exploiting relationships between the data blocks and a change log for the long-running transaction. FIG. 6 depicts example relationships between data blocks and a change log. Referring to FIG. 6, change log 600 includes undo records 602A-N. Data blocks 106A-N include header data 604A-N, which in turn include pointers 606A-N and last-changed timestamps 608A-N. Pointer 606A refers to undo record 602B, and pointer 606N refers to undo record 602N.

Change log 600 is a collection of previous versions of data for a particular transaction. Change log 600 may include undo records 602A-N that are linked together as a chain. Each undo record may store an image of data prior to the data being changed. If the particular transaction fails to commit, undo records 602A-N may be used to restore the previous versions of data. If the particular transaction commits, change log 600 and/or undo records 602A-N may be deleted.

Each data block includes header data that stores metadata. The metadata includes a respective last-changed timestamp for each data block. Additionally, the metadata may include a pointer to an undo record for a particular data block. Thus, editing last-changed timestamps for all data blocks modified by a long-running transaction may involve (1) determining a first data block that was modified by the long-running transaction; (2) advancing the first data block's last-changed timestamp to a desired timestamp; (3) dereferencing a pointer to identify a first undo record corresponding to the first data block; (4) based on the first undo record, identifying a second undo record in change log 600 for the long-running transaction; (5) based on the second undo record, identifying a second data block that was modified by the long-running transaction; (6) advancing the second data block's last-changed timestamp to the desired timestamp; and (7) traversing through any remaining undo records in change log 600 until all the last-changed timestamps have been advanced for the data blocks modified by the long-running transaction.

To maintain transactional consistency, undo records 602A-N and redo records (not shown) may be generated and persisted prior to editing any timestamps. In contrast to undo records which store images of data prior to changes, redo records store descriptions of the changes.

Process Overview

Figure 7:
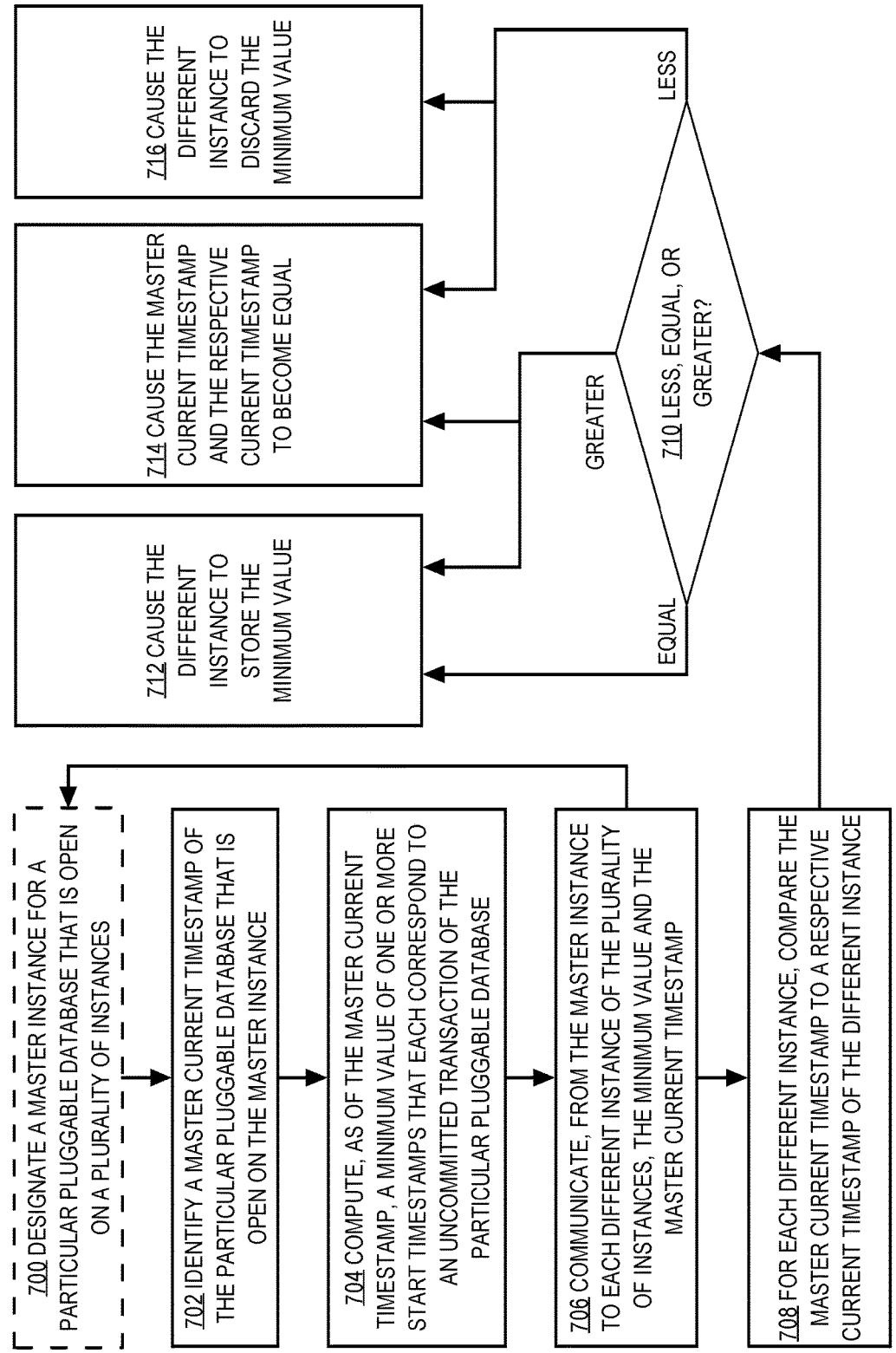
FIG. 7 is a flow diagram that depicts an approach for computing a minimum value for a pluggable database.

FIG. 7 is a flow diagram that depicts an approach for computing a minimum value for a pluggable database. At optional block 700, a first database instance is determined to be a master instance for a particular pluggable database that is open on a plurality of database instances. This determination may be performed periodically and may result in another database instance obtaining mastership for the particular pluggable database. In the example of FIG. 7, block 700 may be performed again after block 706.

At block 702, the first database instance identifies a first current timestamp. The first current timestamp may be a local most-recent SCN of the first database instance. In other words, the first current timestamp may reflect the first database instance's knowledge of transactions.

At block 704, the first database instance computes a minimum value of one or more start timestamps that are known to the first database instance as of the first current timestamp. The one or more start timestamps are stored in one or more transaction tables of the particular pluggable database. Each start timestamp corresponds to an uncommitted transaction that was executed, in the first database instance, against data of the particular pluggable database.

The minimum value guarantees that any transaction with a start timestamp less than the minimum value is a committed transaction. When a reader encounters a data block, the reader compares a last-changed timestamp of the data block to the minimum value to quickly determine whether it is safe to read the data block. However, at this point, the minimum value's guarantee is only applicable to transactions known to the first database instance.

Determining a global minimum value for the particular pluggable database involves synchronization of current timestamps between/among the plurality of database instance. At block 706, the first database instance communicates the minimum value and the first current timestamp to all other database instances of the plurality of database instances. Inter-instance communication may be performed asynchronously. In some example embodiments, each database instance may maintain a history of inter-instance communications related to published minimum values. After block 706 is performed, the first database instance may relinquish mastership, and a different database instance may obtain mastership for the particular pluggable database at optional block 700.

At block 708, each database instance that received the first current timestamp compares the first current timestamp to its own current timestamp. For example, a second database instance may have a second timestamp that is a local most-recent SCN of the second database instance. Thus, the second database instance compares the first current timestamp to the second current timestamp.

At block 710, each database instance that received the first current timestamp determines whether the first current timestamp is less than, equal to, or greater than its own current timestamp. If the first current timestamp is smaller, block 710 proceeds to blocks 714 and 716. If the first current timestamp is equivalent, block 710 proceeds to block 712. If the first current timestamp is bigger, block 710 proceeds to blocks 712 and 714.

At block 712, a database instance with a current timestamp that is less than or equal to the first current timestamp will store the minimum value. In other words, the minimum value's guarantee now extends to transactions known to this database instance.

At block 714, a database instance with a current timestamp that is less than the first current timestamp will also advance its current timestamp to become equal to the first current timestamp. However, a database instance with a current timestamp that is greater than the first current timestamp will send its own current timestamp in a message to the first database instance so that the first database instance can advance the first current timestamp.

At block 716, a database instance with a current timestamp that is greater than the first current timestamp will also discard the minimum value received from the first database instance. Thus, determining the global minimum value for the particular pluggable database may involve another iteration of at least blocks 702-710.

Figure 8:
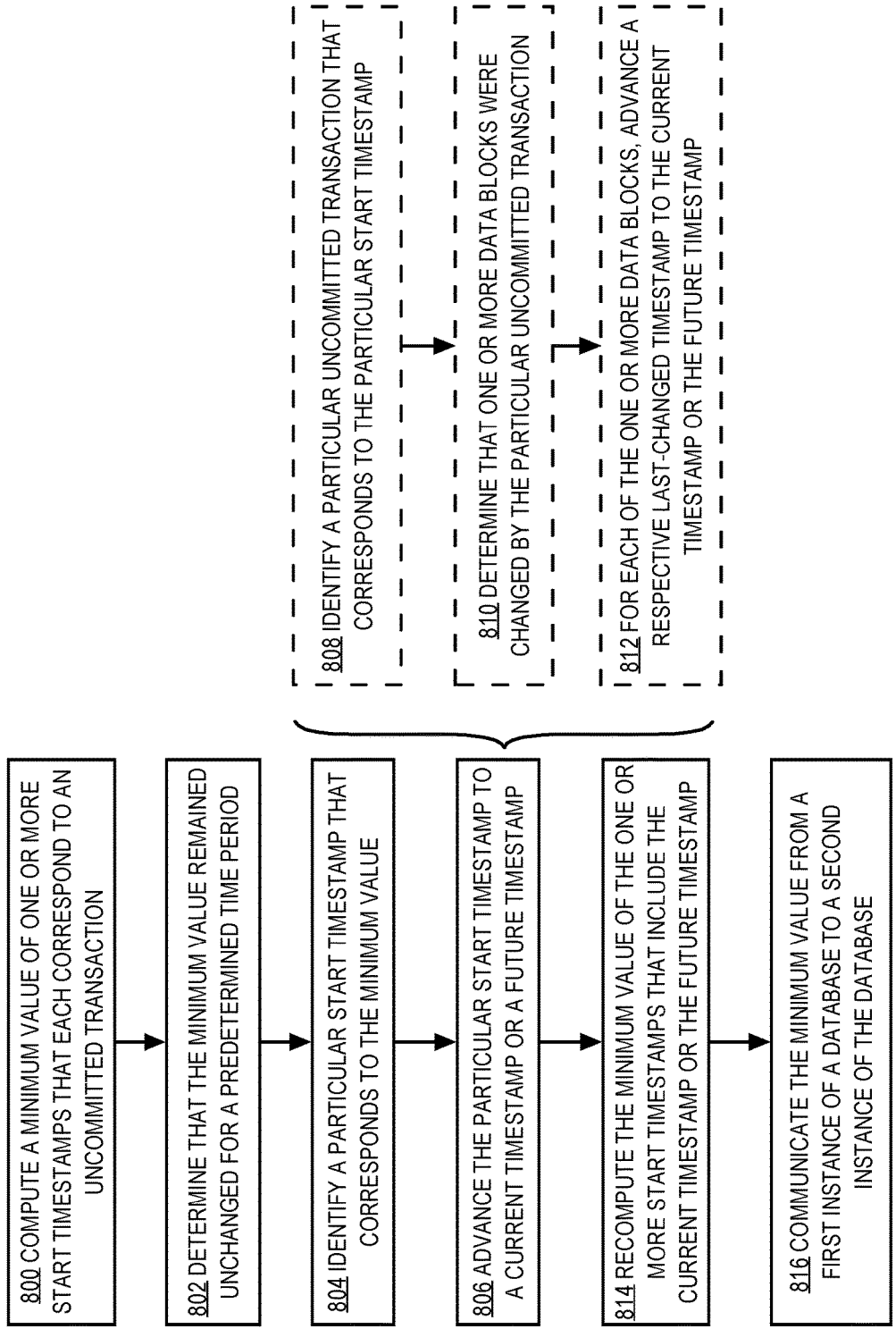
FIG. 8 is a flow diagram that depicts an approach for causing a minimum value to advance.

FIG. 8 is a flow diagram that depicts an approach for causing a minimum value to advance. At block 800, a database instance computes a minimum value of one or more start timestamps that each correspond to an uncommitted transaction. In some example embodiments, the minimum value is computed according to the approach depicted in FIG. 7.

At block 802, a particular database instance determines that the minimum value remained unchanged for a predetermined time period. The particular database instance may be the database instance that computed the minimum value or a different database instance.

At block 804, the particular database instance identifies a particular start timestamp, of the one or more start timestamps, that corresponds to the minimum value. For example, the particular database instance may search one or more transaction tables and determine that the minimum value corresponds to a start timestamp of an oldest uncommitted transaction.

At block 806, the particular database instance advances the particular start timestamp to a current timestamp or a future timestamp. Block 806 may be performed prior to, concurrently with, or subsequent to any of optional blocks 808-812.

At optional block 808, the particular database instance identifies a particular uncommitted transaction that corresponds to the particular start timestamp. For example, the particular uncommitted transaction may be a long-running transaction.

At optional block 810, the particular database instance determines that one or more data blocks were changed by the particular uncommitted transaction. In some example embodiments, this determination may involve traversing a change log that is maintained for the particular uncommitted transaction. The change log may include linked undo records that will be deleted when the particular uncommitted transaction commits. The particular database instance may identify the change log for the particular uncommitted transaction based on header data of the one or more data blocks. The header data may store a pointer to the change log. Additionally, the header data may identify each transaction that modified a particular data block.

At optional block 812, the particular database instance advances a respective last-changed timestamp of each data block that was modified by the particular uncommitted transaction. Each last-changed timestamp is edited to be equivalent to the current timestamp or the future timestamp of block 806. Block 812 may be performed concurrently with or subsequent to block 810.

At block 814, the particular database instance recomputes the minimum value. However, the one or more start timestamps now include the particular start timestamp that was advanced in block 806 to be equivalent to the current timestamp or the future timestamp. In other words, the particular database instance computes a new minimum value that is greater than the minimum value computed in block 800.

At block 816, the particular database instance communicates the minimum value to a different database instance. Database instances may store the minimum value where it can be accessed by a reader. The reader may compare the minimum value to a particular last-changed timestamp of a particular data block and determine that all transactions that modified the particular data block are committed transactions if the minimum value is greater than the particular last-changed timestamp.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
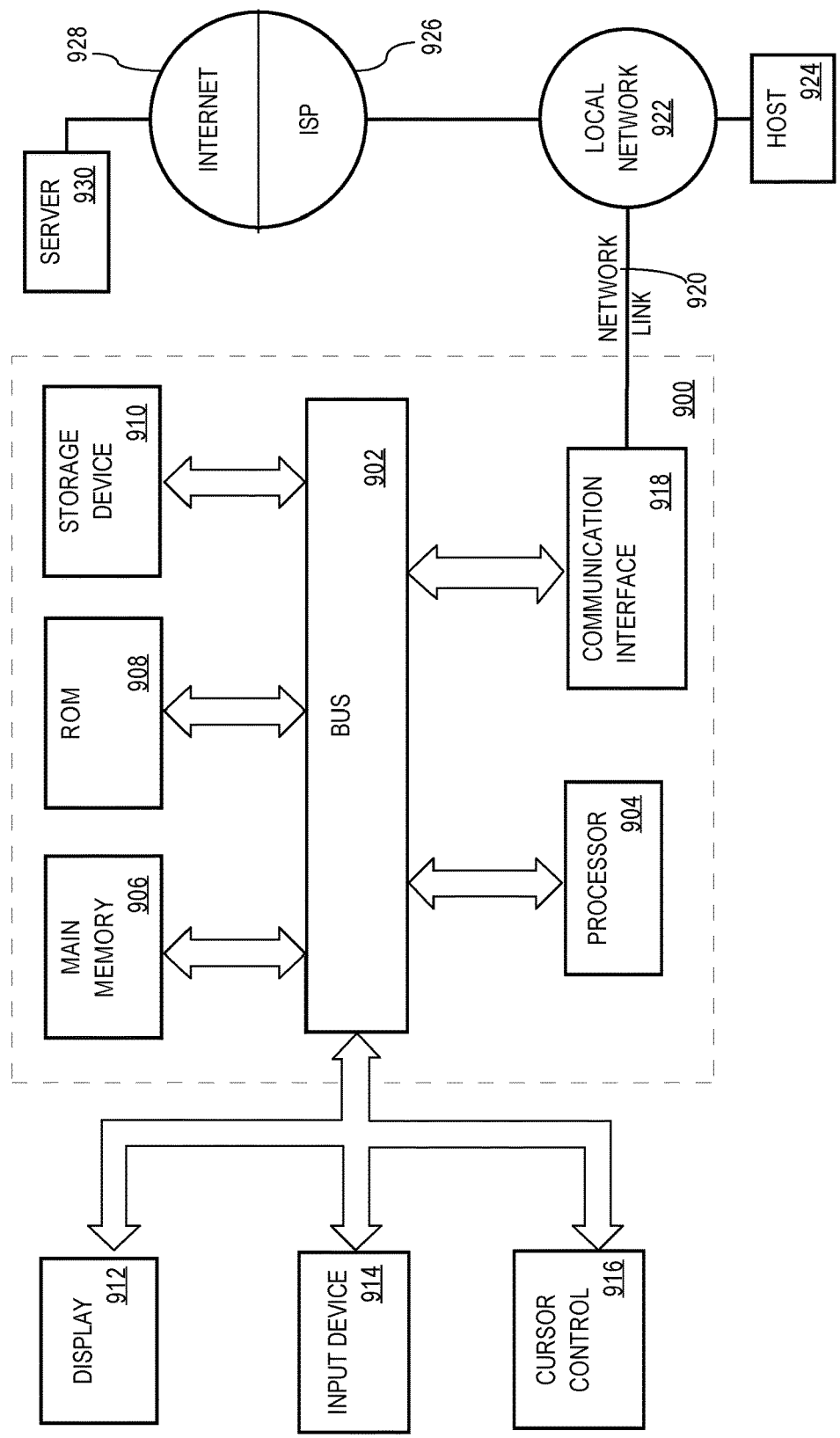
FIG. 9 depicts a computer system upon which an embodiment may be implemented.

For example, FIG. 9 is a block diagram that depicts a computer system 900 upon which an embodiment may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   computing a minimum value of one or more start timestamps that each correspond to an uncommitted transaction;
   determining that said minimum value remained unchanged for a predetermined time period;
   identifying a particular start timestamp, of said one or more start timestamps, that corresponds to said minimum value;
   advancing said particular start timestamp to a current timestamp or a future timestamp;
   recomputing said minimum value of said one or more start timestamps that comprise said current timestamp or said future timestamp;
   after recomputing said minimum value, communicating said minimum value from a first instance of a database to a second instance of said database,
   wherein said method is performed by one or more computing devices.

2. Said method of claim 1, wherein advancing said particular start timestamp to said current timestamp or said future timestamp includes:
   identifying a particular uncommitted transaction that corresponds to said particular start timestamp;
   determining that one or more data blocks were changed by said particular uncommitted transaction;

for each of said one or more data blocks, advancing a respective last-changed timestamp to said current timestamp or said future timestamp.

3. Said method of claim 2, wherein determining that said one or more data blocks were changed by said particular uncommitted transaction includes traversing a change log that is maintained for said particular uncommitted transaction.

4. Said method of claim 3, wherein said change log includes linked undo records.

5. Said method of claim 3, wherein the method further includes deleting said change log when said particular uncommitted transaction is committed.

6. Said method of claim 3, wherein each of said one or more data blocks includes header data that stores a pointer to said change log.

7. Said method of claim 6, wherein said header data identifies each transaction that modified a particular data block associated with said header data.

8. Said method of claim 1, wherein said minimum value guarantees that any transaction with a start timestamp less than said minimum value is committed.

9. Said method of claim 1, wherein said minimum value guarantees that any transaction that modified a particular data block with a particular last-changed timestamp that is less than said minimum value is a committed transaction.

10. Said method of claim 1, wherein said one or more start timestamps are stored in one or more transaction tables of a database.

11. One or more non-transitory storage media storing one or more sequences of instructions which, when executed by one or more computing devices, cause:
computing a minimum value of one or more start timestamps that each correspond to an uncommitted transaction;
determining that said minimum value remained unchanged for a predetermined time period;
identifying a particular start timestamp, of said one or more start timestamps, that corresponds to said minimum value;
advancing said particular start timestamp to a current timestamp or a future timestamp;
recomputing said minimum value of said one or more start timestamps that comprise said current timestamp or said future timestamp;
after recomputing said minimum value, communicating said minimum value from a first instance of a database to a second instance of said database.

12. Said one or more non-transitory storage media of claim 11, wherein advancing said particular start timestamp to said current timestamp or said future timestamp includes:
identifying a particular uncommitted transaction that corresponds to said particular start timestamp;
determining that one or more data blocks were changed by said particular uncommitted transaction;
for each of said one or more data blocks, advancing a respective last-changed timestamp to said current timestamp or said future timestamp.

13. Said one or more non-transitory storage media of claim 12, wherein determining said one or more data blocks were changed by said particular uncommitted transaction includes traversing a change log that is maintained for said particular uncommitted transaction.

14. Said one or more non-transitory storage media of claim 13, wherein said change log includes linked undo records.

15. Said one or more non-transitory storage media of claim 13, wherein said sequences of instructions include instructions that, when executed by said one or more computing devices, causes deleting said change log when said particular uncommitted transaction is committed.

16. Said one or more non-transitory storage media of claim 13, wherein each of said one or more data blocks includes header data that stores a pointer to said change log.

17. Said one or more non-transitory storage media of claim 16, wherein said header data identifies each transaction that modified a particular data block associated with said header data.

18. Said one or more non-transitory storage media of claim 11, wherein said minimum value guarantees that any transaction with a start timestamp less than said minimum value is committed.

19. Said one or more non-transitory storage media of claim 11, wherein said minimum value guarantees that any transaction that modified a particular data block with a particular last-changed timestamp that is less than said minimum value is a committed transaction.

20. Said one or more non-transitory storage media of claim 11, wherein said one or more start timestamps are stored in one or more transaction tables of a database.

* * * * *

UNITED STATES PATENT AND TRADEMARK OFFICE
CERTIFICATE OF CORRECTION

PATENT NO. : 10,303,788 B2
APPLICATION NO. : 15/253630
DATED : May 28, 2019
INVENTOR(S) : Kulkarni et al.

Page 1 of 1

It is certified that error appears in the above-identified patent and that said Letters Patent is hereby corrected as shown below:

On page 2, Column 1, under Other Publications, Line 2, delete "2019." and insert -- 2018. --, therefor.

Signed and Sealed this
Twenty-first Day of July, 2020

Andrei Iancu
*Director of the United States Patent and Trademark Office*